United States Patent [19]

Neuhalfen

[11] 4,373,488
[45] Feb. 15, 1983

[54] INTERNAL COMBUSTION ENGINE ELECTRONIC IGNITION SYSTEM

[75] Inventor: Michael A. Neuhalfen, Galveston, Ind.

[73] Assignee: General Motors Corporation, Detroit, Mich.

[21] Appl. No.: 264,663

[22] Filed: May 18, 1981

[51] Int. Cl.³ ............................................. F02P 5/08
[52] U.S. Cl. .................................... 123/418; 123/427
[58] Field of Search ............ 123/418, 424, 427, 415, 123/414

[56] References Cited

U.S. PATENT DOCUMENTS

| | | | |
|---|---|---|---|
| 2,801,340 | 7/1957 | Keonjian et al. | 250/36 |
| 3,573,545 | 4/1971 | Warner | 123/418 |
| 3,756,212 | 9/1973 | Schirmer et al. | 123/415 |
| 3,874,351 | 4/1975 | Adler et al. | 123/418 |
| 4,131,098 | 12/1978 | Daniels et al. | 123/418 |
| 4,142,489 | 3/1979 | Menard | 123/418 |

*Primary Examiner*—Charles J. Myhre
*Assistant Examiner*—Andrew M. Dolinar
*Attorney, Agent, or Firm*—Richard G. Stahr

[57] ABSTRACT

Included in an internal combustion engine electronic ignition system of the type having discrete circuits responsive to each selected half cycle of a series of engine synchronized alternating current timing signals for effecting engine speed ignition spark advance adjustment and for producing a series of substantially square wave electrical signals having trailing edges substantially coincident with the point of zero crossover of each selected half cycle into the next half cycle is circuitry responsive to the square wave electrical signals for inhibiting engine speed ignition spark advance adjustment with engine speeds less than a selected value.

5 Claims, 8 Drawing Figures

| R | S | Q(t+1) |
|---|---|--------|
| 0 | 0 | Q(t)   |
| 1 | 0 | 0      |
| 0 | 1 | 1      |
| 1 | 1 | 0      |

Q(t) ≡ CURRENT STATE
Q(t+1) ≡ NEXT STATE

*Fig. 8*

INTERNAL COMBUSTION ENGINE ELECTRONIC IGNITION SYSTEM

This invention is directed to internal combustion engine electronic ignition systems of the type including circuitry for providing engine speed ignition spark advance adjustment and, more specifically, to ignition systems of this type that also include circuitry for inhibiting the operation of the engine speed ignition spark advance adjustment circuitry with engine speeds less than a selected value.

Many internal combustion engine electronic ignition systems have a control unit that is responsive to a series of engine synchronized alternating current timing signals for effecting an ignition spark event for each engine cylinder. Some of these ignition systems also include circuitry that is operative to provide electronic engine speed ignition spark advance adjustment in accordance with a predetermined engine speed ignition spark advance curve between selected minimum and maximum engine speeds. With engines equipped with this electronic ignition system combination, it is necessary that there be no engine speed ignition spark advance involved during the period of initial ignition spark advance adjustment while the engine is running. Therefore, it is important that the electronic engine speed ignition spark advance adjustment circuitry be inhibited at engine speeds less than a selected value as determined by the engine speed at which initial ignition spark advance is adjusted. The provision of additional circuitry that is operative to inhibit the engine speed ignition spark advance adjustment circuitry with engine speeds less than the selected value, therefore is a desirable feature.

It is, therefore, an object of this invention to provide an improved internal combustion engine electronic ignition system.

It is another object of this invention to provide an improved internal combustion engine electronic ignition system including circuitry responsive to each selected half cycle of a series of alternating current timing signals produced in synchronism with an associated engine for effecting engine speed ignition spark advance adjustment, for producing a series of substantially square wave electrical signals having trailing edges substantially coincident with the point of zero crossover of each selected half cycle into the next half cycle and circuitry for inhibiting engine speed ignition spark advance adjustment with engine speeds less than a selected value.

It is an additional object of this invention to provide an improved internal combustion engine electronic ignition system of the type that includes circuitry responsive to each selected half cycle of a series of alternating current timing signals produced in synchronism with an associated engine for effecting engine speed ignition spark advance adjustment and for producing a series of substantially square wave electrical signals having trailing edges substantially coincident with the point of zero crossover of each selected half cycle into the next half cycle and additional circuitry effective to inhibit the engine speed ignition spark advance adjustment circuitry in response to a time variable electrical signal that is initiated at each trailing edge of the square wave electrical signals and is terminated at each leading edge of the square wave electrical signals.

In accordance with this invention, an internal combustion engine electronic ignition system having mutually exclusive discrete circuits responsive to each selected half cycle of a series of engine synchronized alternating current timing signals for effecting engine speed ignition spark advance adjustment and for producing a series of substantially square wave electrical signals having trailing edges substantially coincident with the point of zero crossover of each selected half cycle into the next half cycle is provided wherein additional circuitry is provided for inhibiting the operation of the engine speed ignition spark advance adjustment circuitry with engine speeds less than a selected value in response to time variable electrical signals initiated and terminated at each trailing and leading edge, respectively, of the square wave electrical signals.

For a better understanding of the present invention, together with additional objects, advantages and features thereof, reference is made to the following description and accompanying drawing wherein.

As point of reference or ground potential is the same point electrically throughout the system, it is illustrated in the drawing by the accepted schematic symbol and is referenced by the numeral 2.

Figure 1:
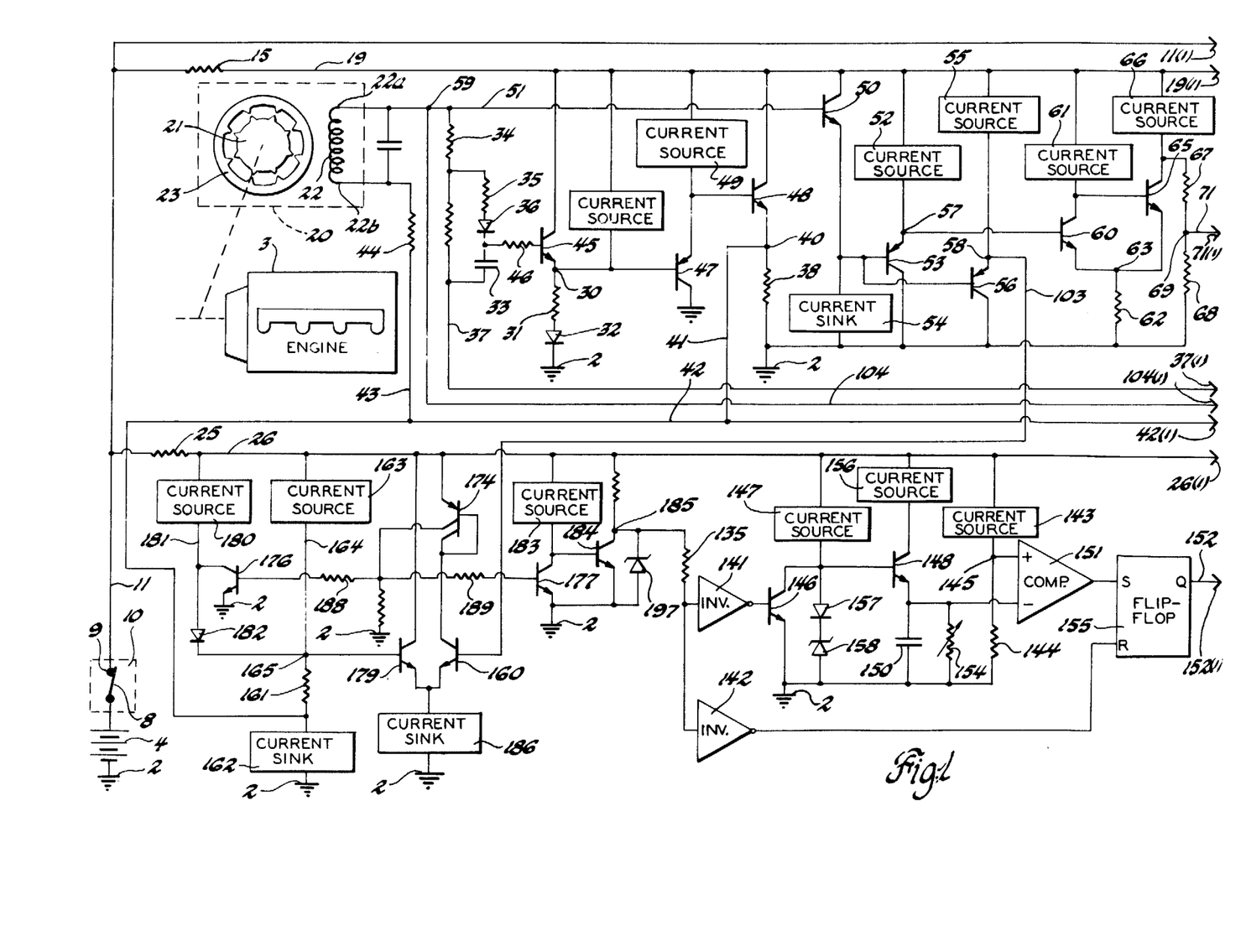
FIG. 1 is a schematic circuit of a portion of the internal combustion engine electronic ignition system of this invention.
Figure 2:
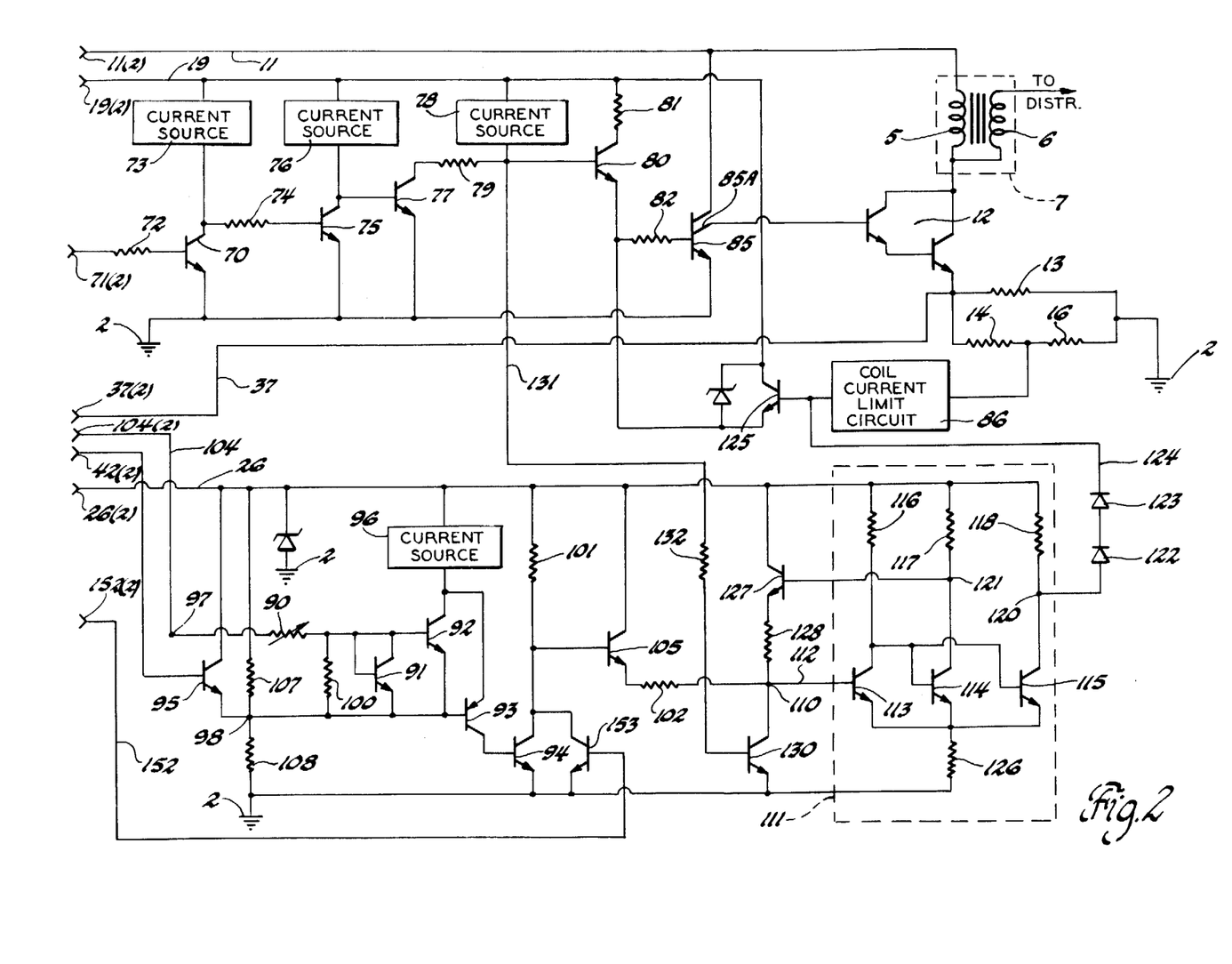
FIG. 2 is a schematic circuit of the remainder of the internal combustion engine electronic ignition system of this invention.

The circuit combination of FIGS. 1 and 2 employs a plurality of current sources and current sinks. As these current sources and current sinks may be conventional circuitry well known in the art that, per se, form no part of this invention, the current source and current sink circuitry is illustrated in block form.

In accordance with logic terminology well known in the art, throughout this specification logic signals will be referred to as "High" or logic 1 and "Low" or logic 0 signals. For purposes of this specification, and without intention or inference of a limitation thereto, the "High" or logic 1 signals will be considered to be of a positive polarity potential and the "Low" or logic 0 signals will be considered to be zero or ground potential.

An internal combustion engin electronic ignition system for controlling the ignition spark event of each cylinder of an associated internal combustion engine is set forth schematically in FIGS. 1 and 2 and includes: (1) an electrical generator assembly for producing a series of alternating current timing signals in synchronism with an associated engine; (2) an electronic control unit responsive to the series of alternating current timing signals for effecting an ignition spark event for each cylinder of the engine; (3) a circuit responsive to each selected half cycle of the series of alternating current timing signals that is operative to effect engine speed ignition spark advance adjustment; (4) a circuit responsive to each selected half cycle of the series of alternating current timing signals that is operative to produce a series of substantially square wave electrical signals having leading and trailing edges with the trailing edges being substantially coincident with the point of zero crossover of each selected half cycle of the timing signals into the next half cycle; and (5) the improvement of a circuit responsive to the square wave electrical signal trailing and leading edges that is operative to inhibit engine speed ignition spark advance adjustment with engine speeds less than a selected value.

Referring to the drawing, the internal combustion engine electronic ignition system of this invention is set forth in combination with an internal combustion engine 3, FIG. 1, a source of operating potential that may be a conventional automotive type storage battery 4, and a conventional ignition coil 7, FIG. 2, having a primary winding 5 and a secondary winding 6 in which a high ignition spark potential is induced upon the interruption of the energizing circuit of primary winding 5. The energizing circuit for primary winding 5 of ignition coil 7 may be traced from the positive polarity output terminal of battery 4, FIG. 1, through movable contact 8 and stationary contact 9 of electrical switch 10, while closed, positive polarity potential lead 11, circuit points 11(1) and 11(2) of respective FIGS. 1 and 2, the FIG. 2 extension of lead 11, primary winding 5 of ignition coil 7, the current-carrying electrodes of NPN transistor switching Darlington pair 12, the parallel combination of resistor 13 and series resistors 14 and 16 and point of reference or ground potential 2 to the negative polarity output terminal of battery 4. With regard to electrical switch 10, movable contact 8 and stationary contact 9 may be the normally open "ignition circuit" contacts of a conventional automotive type ignition switch. As is well known in the automotive art, upon each interruption of the energizing circuit of primary winding 5 of ignition coil 7, a high ignition spark potential is induced in secondary winding 6 that is directed by the ignition distributor (not shown) to the spark plug of the cylinder of the associated engine to be fired. As ignition distributors and the function thereof are well known in the art and, per se, form no part of this invention, in the interest of reducing drawing complexity, the ignition distributor is not illustrated in the drawing. It is to be specifically understood, however, that the free terminal end of secondary winding 6 of ignition coil 7 is connected to the rotary contact of the associated automotive type ignition distributor.

Figure 3:
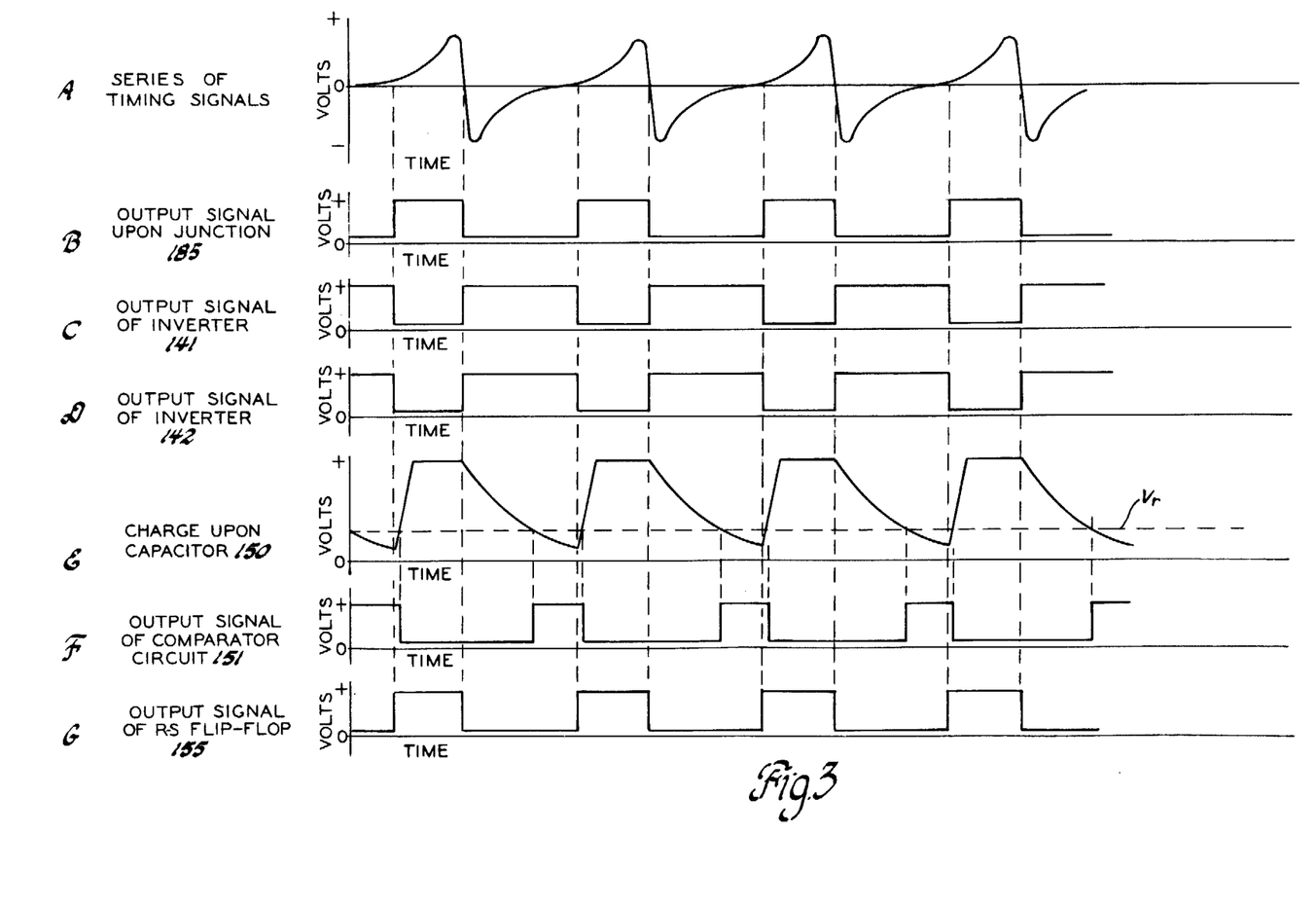
FIGS. 3, 4, 5, 6 and 7 are sets of curves useful in understanding the operation of the internal combustion engine electronic ignition systems of FIGS. 1 and 2.
Figure 5:
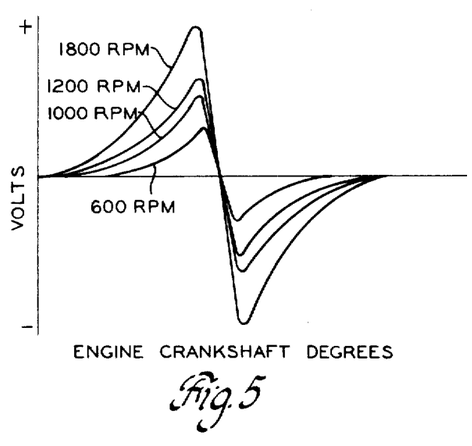

To produce a series of alternating current timing signals in synchronism with an associated engine that are so phased relative to engine crankshaft angle that a selected polarity transition of each cycle thereof occurs at a preselected constant engine crankshaft angle relative to piston top dead center, there may be employed an electrical generator assembly 20 of the type having at least a rotatable rotor member 21 and an output coil 22 in which a series of alternating current timing signals is magnetically induced in synchronism with the associated engine 3 while the rotor member 21 is rotated by and in synchronism with the engine 3 in a manner well known in the automotive art. For example, rotor member 21 may be mounted upon the ignition distributor shaft in such a manner as to be rotated therewith while the distributor shaft is rotated in synchronism with engine 3 by a gear drive to the engine camshaft as is common in the automotive art. FIG. 3A illustrates a series of alternating current timing signals produced by an actual electrical generator assembly and one complete cycle of the alternating current timing signals produced by this actual electrical generator assembly for each of four different engine speeds is illustrated by the curves of FIG. 5. Although each cycle of these timing signals has a positive to negative going polarity transition at substantially the same engine crankshaft angle at all engine speeds, the amplitude of these timing signals is directly proportional to engine speed, the greater the engine speed the greater the amplitude.

The source of alternating current timing signals, electrical generator assembly 20, may be any one of the several conventional magnetic distributors well known in the automotive art. One example of a magnetic distributor well known in the automotive art suitable for use with the ignition system of this invention is of the variable reluctance type disclosed and described in U.S. Pat. No. 3,254,247, Falge, that issued May 31, 1966 and is assigned to the same assignee as that of the present invention. In the interest of reducing drawing complexity, the variable reluctance type ignition distributor disclosed and described in U.S. Pat. No. 3,254,247 has been set forth schematically in FIG. 1. Rotor member 21 is rotated in synchronism with engine 3 by engine 3 in a manner well known in the automotive art within the bore of a pole piece 23. Equally spaced about the outer periphery of rotor member 21 and about the bore of pole piece 23 are a series of projections equal in number to the number of cylinders of the engine with which the distributor and system of this invention is being used. The electrical generator assembly 20 illustrated in FIG. 1 is for use with an 8-cylinder engine. In this regard, only the right side cylinder bank of a V-8 engine is illustrated in FIG. 1. Pole piece 23 may be made up of a stack of a number of laminations of magnetic material secured in stacked relationship by rivets or bolts or any other convenient fastening method and the magnetic flux may be provided by a permanent magnet, not shown, that may be secured to the lower face surface thereof. As each projection on rotor member 21 approaches a projection on pole piece 23, the reluctance of the magnetic path between rotor member 21 and pole piece 23 decreases and as each projection on rotor member 21 moves away from a projection on pole piece 23, the reluctance of the magnetic circuit between rotor member 21 and pole piece 23 increases. Consequently, the magnetic field produced by the permanent magnet increases and decreases as each projection on rotor member 21 approaches and passes a projection on pole piece 23, a condition that induces an alternating current potential in output coil 22, magnetically coupled to pole piece 23, of a waveform substantially as shown in FIGS. 3 and 5.

Upon the closure of movable contact 8 of electrical switch 10 into electrical circuit closing engagement with stationary contact 9, as shown in the drawing, battery 4 operating potential is supplied to the circuitry of FIG. 1 through current limiting resistors 15 and 25 and respective positive polarity potential leads 11, 19 and 26 and to the circuitry of FIG. 2 through circuit points 11(1) and 11(2), 19(1) and 19(2), and 26(1) and 26(2) of respective FIGS. 1 and 2 and the FIG. 2 extension of positive polarity potential leads 11, 19 and 26.

Figure 6:
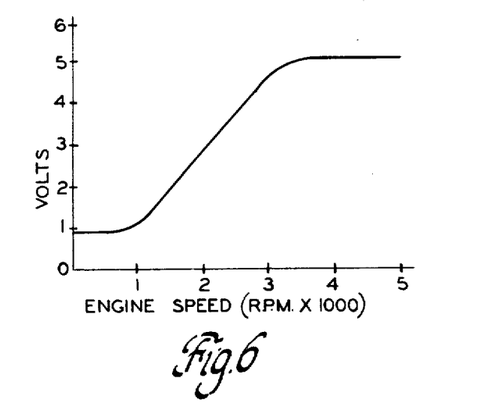

While the associated internal combustion engine 3 is not running with switch 10 closed, there is present upon junction 30 of FIG. 1 a direct current potential signal of a positive polarity with respect to point of reference or ground potential 2 and of a magnitude equal to the sum of the potential drops across resistor 31 and diode 32. In the actual embodiment of the circuit of this invention, this potential signal is of the order of 0.9 of a volt while engine 3 is not running. While engine 3 is in the Run mode, capacitor 33 is charged by the halfwave rectified alternating current timing signals induced in output coil 22 of electrical generator assembly 20. During each positive polarity half cycle of the alternating current timing signals induced in output coil 22 while the terminal end 22a thereof is of a positive polarity with respect to terminal end 22b, capacitor 33 charges through a circuit that may be traced from terminal end 22a of output coil 22, through resistors 34 and 35, diode 36, capacitor 33, lead 37, circuit points 37(1) and 37(2) of respective FIGS. 1 and 2, the FIG. 2 extension of lead 37, the parallel combination of resistor 13 and series resistors 14 and 16, point of reference or ground potential 2, resistor 38 of FIG. 1, junction 40, leads 41, 42 and 43 and resistor 44 to terminal end 22b of output coil 22. The charge upon capacitor 33 supplies base-emitter drive current through resistor 46 to NPN transistor 45 to render this device conductive through the collector-emitter electrodes. While NPN transistor 45 is conductive, the additional current supplied thereby through resistor 31 and diode 32 results in an increased potential drop across resistor 31 that is of a positive polarity upon junction 30 with respect to point of reference or ground potential 2. As has been previously brought out in this specification, as the speed of the associated internal combustion engine increases, the amplitude of the alternating current timing signals induced in output coil 22 of electrical generator assembly 20 increases. Consequently, as the speed of the associated internal combustion engine increases, the charge upon capacitor 33 increases to supply an increasing base-emitter drive current to NPN transistor 45. As a result of this increased base-emitter drive current, the collector-emitter conduction of NPN transistor 45 increases to supply more current through resistor 31 and diode 32. This increased current flow through resistor 31 produces an increased potential drop thereacross of a positive polarity potential upon junction 30 with respect to point of reference or ground potential 2. Therefore, the potential level magnitude of the signal upon junction 30 with respect to point of reference or ground potential 2 increases with engine speed, as shown in FIG. 6, wherein the potential level magnitude in volts upon junction 30 with respect to point of reference or ground potential 2 is plotted against engine speed in RPM. In the actual embodiment as shown by the curve of FIG. 6, the potential level magnitude of the signal upon junction 30 with respect to point of reference or ground potential 2 is substantially constant during engine speeds up to a first value, increases substantially linearly in value to a substantially constant maximum value with an increase of engine speed between the first value and a second value and remains at the substantially constant maximum value with engine speeds greater than the second value. This is because of the saturation of NPN transistor 45 and the magnetic circuit of electrical generator assembly 20 at these higher engine speeds. The combination of PNP transistor 47, NPN transistor 48 and current source 49 comprises a unity gain amplifier circuit that prevents undesirable loading of the electrical generator assembly 20 output coil 22. As the potential level of the signal upon junction 30 is increased by one diode rise across PNP transistor 47 and is reduced by one diode drop across NPN transistor 48, the potential level of the signal upon junction 40 is substantially equal to and follows that upon junction 30, both with respect to point of reference or ground potential 2. As terminal end 22b of output coil 22 of electrical generator assembly 20 is connected to junction 40 through leads 41, 42 and 43 and resistor 44, the potential level with respect to point of reference or ground potential upon terminal end 22b of output coil 22 is equal to and follows that upon junction 40.

While engine 3 is running, the alternating current timing signals are induced in output coil 22 of electrical generator assembly 20. As the potential level upon terminal end 22a of output coil 22 of electrical generator assembly 20 begins to increase in a positive going direction during the positive polarity half cycles of the alternating current timing signals induced in output coil 22, a potential level is reached at which base-emitter drive current is supplied through lead 51 to NPN transistor 50 to reader NPN transistor 50 conductive through the collector-emitter electrodes thereof. The combination of NPN transistor 50, current source 52, PNP transistor 53 and current sink 54 comprises a unity gain amplifier circuit and the combination of NPN transistor 50, current source 55, PNP transistor 56 and current sink 54 comprises another unity gain amplifier circuit. These unity gain amplifier circuits prevent undesirable loading of the electrical generator assembly 20 output coil 22. The potential level with respect to point of reference or ground potential 2 upon terminal end 22a of output coil 22 as each cycle of the alternating timing signals induced therein cycles through the positive and negative polarity excursions appears upon the base electrode of NPN transistor 50. As the potential level of this signal upon the base electrode of NPN transistor 50 is reduced by one diode drop across transistor 50 and is increased by one diode rise across each of PNP transistors 53 and 56, the potential level of the signal upon each of junctions 57 and 58 is substantially equal to and follows that upon terminal end 22a of output coil 22 while transistor 50 is conducting, all with respect to point of reference or ground potential 2. The potential level of the signal upon junctions 57 and 58, therefore, may be considered to be that of the signal upon terminal end 22a of output coil 22.

When the potential signal with respect to point of reference or ground potential 2 upon terminal end 22a of output coil 22 and, hence, upon junction 57, during each positive polarity half cycle of the alternating current timing signal induced in output coil 22 increases to a potential level sufficient to provide base-emitter drive current to NPN transistor 60, this device is rendered conductive through the collector-emitter electrodes thereof. Conducting transistor 60 sinks the current supplied by current source 61 to point of reference or ground potential 2 through common emitter resistor 62. With current flowing through resistor 62, the potential drop thereacross appearing upon junction 63 is of a sufficient magnitude to maintain NPN transistor 65 not conductive. With NPN transistor 65 not conductive, the current supplied by current source 66 flows through series resistors 67 and 68. The potential level upon junction 69, as a result of this current flow, is sufficient to supply base-emitter drive current through lead 71, circuit points 71(1) and 71(2) of respective FIGS. 1 and 2 and resistor 72 to NPN transistor 70, FIG. 2, to render transistor 70 conductive through the collector-emitter electrodes. With transistor 70 conductive, the current supplied by current source 73 is sinked to point of reference or ground potential 2 through the current carrying elements thereof. As a consequence, there is no base-emitter drive current supplied to NPN transistor 75 to maintain this device not conductive. While transistor 75 is not conductive, current source 76 supplies base-emitter drive current to NPN transistor 77 to render this device conductive through the collector-emitter electrodes. While NPN transistor 77 is conductive, the current supplied by current source 78 is sinked to point of reference or ground potential 2 through resistor 79 and the collector-emitter electrodes of conducting transistor 77. As this current is sinked to point of reference or ground potential 2, there is no base-emitter drive current supplied to NPN transistor 80, consequently, this device is not conductive. While transistor 80 is not conductive, there is no base-emitter drive current supplied to control transistor 85, consequently, this device is not conductive. Control transistor 85 is a silicon planar transistor described in detail in U.S. Pat. No. 3,838,672, Richards et al, that issued Oct. 1, 1974 and is assigned to the same assignee as that of the present invention. The specification and drawing of this U.S. Pat. No. 3,838,672 is specifically incorporated by reference in this specification. Briefly, however, while this control transistor 85 is not conducting through the collector-emitter electrodes, current flows through the quasi-collector electrode 85A and while this transistor is conducting through the collector-emitter electrodes, substantially no current flows through the quasi-collector electrode 85A. Consequently, while control transistor 85 is not conducting, base-emitter drive current is supplied through the quasi-collector electrode 85A of control transistor 85 to the NPN transistor switching Darlington pair 12. This drive current renders NPN transistor switching Darlington pair 12 conductive through the current carrying elements thereof to complete the previously described energizing circuit for primary winding 5 of ignition coil 7. When the negative going portion of each positive polarity half cycle of the alternating current timing signals upon terminal end 22a of output coil 22 of electrical generator assembly 20 passes through the potential level upon terminal end 22b of output coil 22, there is an insufficient positive polarity potential level upon junction 57, FIG. 1, to supply base-emitter drive current to NPN transistor 60, consequently, this device goes not conductive. When transistor 60 goes not conductive, current source 61 supplies base-emitter drive current to NPN transistor 65 to render this device conductive through the collector-emitter electrodes thereof. Conducting transistor 65 sinks the current supplied by current source 66 to point of reference or ground potential 2 through the current carrying elements thereof and common emitter resistor 62. The potential appearing upon junction 63 as a result of this current flow through common emitter resistor 62 is of a sufficient value to maintain NPN transistor 60 not conductive. Upon the sinking of the current supplied by current source 66 the point of reference or ground potential 2, base-emitter drive current is no longer supplied to NPN transistor 70 of FIG. 2, consequently, this device goes not conductive. Upon transistor 70 going not conductive, current source 73 supplies base-emitter drive current through resistor 74 to NPN transistor 75 to render transistor 75 conductive. Upon the conduction of transistor 75, the current supplied by current source 76 is sinked to point of reference or ground potential 2 through the current carrying elements of transistor 75 to remove base-emitter drive current from NPN transistor 77. Upon the removal of this drive current, NPN transistor 77 goes not conductive. While NPN transistor 77 is not conductive, current source 78 supplies base-emitter drive current to NPN transistor 80 to render this device conductive through the collector-emitter electrodes. Upon the conduction of transistor 80, base-emitter drive current is supplied to control transistor 85 through resistor 81, the current carrying electrodes of transistor 80 and resistor 82. This drive current renders control transistor 85 conductive through the collector-emitter electrodes thereof, a condition that drains base drive current from the NPN transistor switching Darlington pair 12 to render these devices abruptly not conductive. When the NPN transistor switching Darlington pair 12 abruptly goes not conductive, the previously described energizing circuit for primary winding 5 of ignition coil 7 is abruptly interrupted to induce a high ignition spark potential in secondary winding 6 that is directed to the cylinder of engine 3 to be fired through the ignition distributor (not shown) in a manner well known in the automotive art.

The coil current limit circuitry indicated in block form in the drawing and referenced by the numeral 86 operates in response to a predetermined magnitude of current flow through the NPN transistor switching Darlington pair 12 to maintain this current at the predetermined magnitude. This coil current limiting circuitry 86 is disclosed and described in detail in the aforementioned U.S. Pat. No. 3,838,672. From the foregoing description, it is apparent that the electronic ignition system electronic control unit is responsive to the alternating current timing signals for effecting an ignition spark event for each cylinder of engine 3 when the potential upon terminal end 22a of output coil 22 of the electrical generator assembly 20 passes through the potential level upon terminal end 22b of output coil 22. This is substantially at the point of zero crossover of each cycle of the alternating current timing signals in a positive to a negative polarity direction.

Set forth schematically in FIG. 2 is a circuit responsive to each selected half cycle of the series of alternating current timing signals produced in synchronism with engine 3 by electrical generator assembly 20 and is operative to effect engine speed ignition spark advance adjustment. This circuit is disclosed and described in detail in U.S. Pat. No. 4,245,601, Crowder, that issued Jan. 20, 1981 and is assigned to the same assignee as is this invention. The specification and drawing of this U.S. Pat. No. 4,245,601 is specifically incorporated by reference in this specification, therefore, this circuit for effecting engine speed ignition spark advance adjustment will be only briefly described in this specification.

Figure 7:
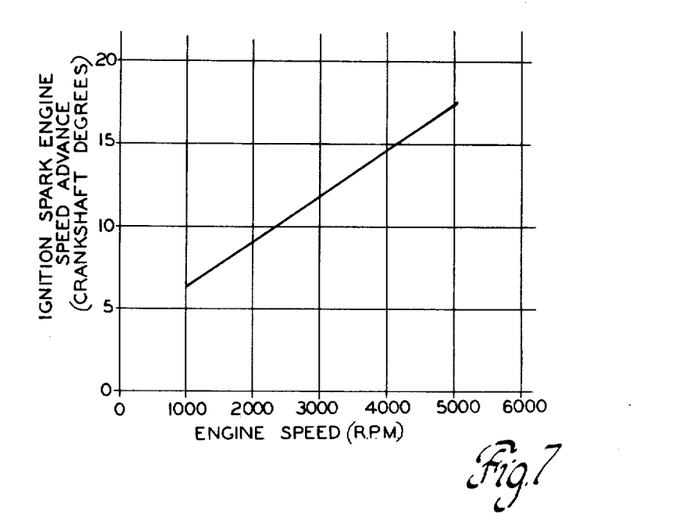

In a manner to be now briefly explained, this circuit that is operative to effect engine speed ignition spark advance adjustment provides an increasing engine speed ignition spark advance with increasing engine speed greater than a selected value that substantially follows a desired engine speed ignition spark advance curve such as that set forth in FIG. 7 by producing an output ignition spark signal that is effective to override the timing signals with respect to the electronic control unit while the engine is operating at a speed equal to and greater than the selected value.

In FIG. 2, the circuit combination including variable resistor 90, NPN transistor 91 connected as a diode, NPN transistor 92, PNP transistor 93, NPN transistors 94, 95 and 105 and constant current source 96 is responsive to a selected input signal potential level across circuit point 97 and junction 98 for producing an output trigger signal. In this trigger signal producing circuit combination, resistor 100 is a temperature compensating resistor.

Junction 59, FIG. 1, upon which is present a potential level equal to the potential level upon terminal end 22a of output coil 22 of electrical generator assembly 20, is connected through lead 104, circuit points 104(1) and 104(2) of respective FIGS. 1 and 2 and the FIG. 2 extension of lead 104 to circuit point 97 of the hereinabove described circuit combination for producing an output trigger signal.

Junction 40, FIG. 1, is connected through leads 41 and 42, circuit points 42(1) and 42(2) of respective FIGS. 1 and 2 and the FIG. 2 extension of lead 42 to the control or base electrode of NPN transistor 95, the collector electrode of which is connected to positive polarity potential lead 26 and the emitter electrode of which is connected to junction 98 between series resistors 107 and 108. As has been previously brought out, the potential level upon terminal end 22b of output coil 22 of electrical generator assembly 20 is equal to and follows the potential level upon junction 40.

With an engine speed equal to the selected value, NPN transistor 95 is rendered not conductive by the reference potential upon junction 98 for the reason that the potential level upon terminal end 22b of output coil 22 of electrical generator assembly 20 is not high enough to overcome the reference potential level upon junction 98. However, the selected input signal potential level applied across circuit point 97 and junction 98 at this engine speed is sufficient to supply sufficient drive current through resistor 90 to NPN transistors 91 and 92 to render these devices conductive. Upon the conduction of NPN transistors 91 and 92, emitter-base drive current is diverted from PNP transistor 93, a condition which renders this device not conductive. Upon PNP transistor 93 going not conductive, base-emitter drive current is not supplied to NPN transistor 94, consequently, this device is not conductive. With NPN transistor 94 not conductive, base-emitter drive current is supplied to NPN transistor 105 through a circuit which may be traced from the positive polarity potential line 26 through resistor 101. This base-emitter drive current renders NPN transistor 105 conductive through the collector-emitter electrodes to produce an output positive polarity trigger signal upon junction 110. This output positive polarity trigger signal effects the triggering of trigger circuit 111 to the alternate state of operation by supplying base-emitter drive current through resistor 102 and lead 112 to NPN transistor 113 to render this device conductive through the collector-emitter electrodes. Upon the conduction of NPN transistor 113, NPN transistors 114 and 115 are abruptly rendered not conductive. When these transistors go not conductive, trigger circuit 111 has been triggered to the alternate state of operation. Resistors 116, 117 and 118 are collector resistors for respective NPN transistors 113, 114 and 115. While trigger circuit 111 is in the alternate state of operation with NPN transistors 114 and 115 not conductive, a positive polarity potential signal is present upon both junctions 120 and 121. The positive polarity potential output ignition spark signal upon junction 120 supplies base-emitter drive current to NPN transistor 125 of the electronic control unit through series diodes 122 and 123 and lead 124. This base-emitter drive current triggers NPN transistor 125 conductive through the collector-emitter electrodes to supply base-emitter drive current to control transistor 85. This base-emitter drive current renders control transistor 85 conductive through the collector-emitter electrodes thereof and, as a consequence, current no longer flows from quasi-collector electrode 85A. With the cessation of current flow from quasi-collector electrode 85A, base-emitter drive current is not longer supplied to NPN transistor switching Darlington pair 12. Consequently, NPN transistor switching Darlington pair 12 is rendered not conductive to interrupt the previously described energizing circuit for primary winding 5 of ignition coil 7. Upon the interruption of this energizing circuit, an ignition spark potential is induced in secondary winding 6 and is directed through the ignition distributor to the spark plug of the engine cylinder to be fired, as is well known in the automotive art. Therefore, this engine speed ignition spark advance adjustment circuit operates to override the alternating current timing signals induced in output coil 22 of electrical generator assembly 20 with respect to the electronic control unit to initiate an ignition spark event at an engine crankshaft angle earlier than that at which an ignition spark would have been initiated by the alternating current timing signals to thereby provide an engine speed ignition spark advance.

With engine speeds equal to and greater than the engine speed at which the potential level upon terminal end 22b of output coil 22 of electrical generator assembly 20 with respect to point of reference or ground potential 2 is of a magnitude equal to and greater than the sum of the reference potential upon junction 98 plus the base-emitter diode drop across NPN transistor 95, base-emitter drive current is supplied to NPN transistor 95 to render this device conductive through the collector-emitter electrodes thereof. Because NPN transistor 95 is connected in an emitter follower configuration, while NPN transistor 95 is conductive at these engine speeds, the potential upon junction 98 substantially follows the potential level with respect to point of reference or ground potential 2 upon terminal end 22b of output coil 22 of electrical generator assembly 20 less the forward base-emitter diode potential drop through NPN transistor 95. As a potential level substantially equal to that upon terminal end 22a of output coil 22 is applied from junction 59, FIG. 1, through circuitry previously described to circuit point 97, with engine speeds equal to and greater than the engine speed at which the potential level upon terminal end 22b of output coil 22 is equal to the reference potential level upon output junction 98 as established by series resistors 107 and 108 plus one forward base-emitter diode drop across NPN transistor 95, when the potential level across output coil 22 reaches a predetermined magnitude, signal of a sufficient potential level to supply base-emitter drive current to NPN transistors 91 and 92 is applied across circuit point 97 and junction 98. This base-emitter drive current to NPN transistors 91 and 92 renders these two devices conductive. Upon the conduction of NPN transistors 91 and 92, an output positive polarity trigger signal is produced upon junction 110 in a manner previously explained. This positive polarity trigger signal triggers trigger circuit 111 to the alternate state of operation in which a positive polarity potential output ignition spark signal is present upon junction 120, as has been previously explained, to initiate an ignition spark event.

With engine speeds less than the selected value, NPN transistor 95 is not conductive because of the reference potential upon junction 98 and because of the resistance value of resistor 90, the input signal applied across circuit point 97 and junction 98 is not of a sufficient potential level to supply sufficient base drive current to NPN transistors 91 and 92 to render these devices conductive. This is for the reason that the resistance value of resistor 90 is so adjusted that the input signal across circuit point 97 and junction 98 will supply base drive current to NPN transistors 91 and 92 only with engine speeds equal to and greater than the selected value. Therefore, constant current source 96 supplies emitter-base drive current to PNP transistor 93. This emitter-base drive current renders PNP transistor 93 conductive through the emitter-collector electrodes thereof to supply base-emitter drive current to NPN transistor 94. This base-emitter drive current renders NPN transistor 94 conductive through the collector-emitter electrodes thereof. While NPN transistor 94 is conductive through the collector-emitter electrodes, base-emitter drive current is drained away from NPN transistor 105, consequently, NPN transistor 105 is not conductive. With transistor 105 not conductive, there is no output signal present upon output junction 110. With no output signal present upon output junction 110, there is no base-emitter drive current supplied to NPN transistor 113 of trigger circuit 111, consequently, NPN transistor 113 is not conductive. While NPN transistor 113 is not conductive, base-emitter drive current is supplied to both of NPN transistors 114 and 115 from positive polarity potential line 26 through resistor 116. As a result of this base-emitter drive current, trigger circuit 111 is in the initial operating state with both of NPN transistors 113 and 114 conductive through collector-emitter electrodes thereof. While trigger circuit 111 is in the initial operating state, therefore, the output signal upon output junction 120 is of a potential level substantially equal to the sum of the potential drops across common emitter resistor 126 and conducting transistor 115. Series diodes 122 and 123 are included to provide a potential drop thereacross substantially equal to the sum of the potential drop across common emitter resistor 126 and the collector-emitter voltage drop across NPN transistor 115. Therefore, there is no output ignition spark signal produced.

As has been previously brought out, one complete cycle of the alternating current timing signals induced in output coil 22 of electrical generator assembly 20 for each of four different engine speeds is illustrated by the curves of FIG. 5 wherein the potential level in volts across output coil 22 is plotted against engine crankshaft degrees. Although these timing signals pass through zero in a positive to a negative going direction at substantially the same engine crankshaft angle, the amplitude of these timing signals is directional proportional to engine speed, the greater the engine speed the greater the amplitude. With the normal operation of the electronic ignition system combination in response to the timing signals, an ignition spark event is initiated at substantially the same engine crankshaft angle at substantially the time the timing signal passes through zero in a positive to a negative going direction for all engine speeds. With the just described engine speed ignition spark advance circuit, an ignition spark event is initiated when the timing signal potential level across output coil 22 of electrical generator assembly 20 reaches a predetermined potential level during each positive going portion of each positive polarity half cycle thereof at which an ignition spark is to be effected to produce an engine speed ignition spark advance that substantially follows a desired engine speed ignition spark advance curve such as that illustrated in FIG. 7.

The positive polarity potential signal upon junction 121 of trigger circuit 111 when in the alternate state of operation supplies base-emitter drive current through to NPN transistor 127 to render this device conductive through the collector-emitter electrodes thereof. Upon the conduction of NPN transistor 127, base-emitter drive current is supplied to NPN transistor 113 through a circuit which may be traced from positive polarity potential line 26, the collector-emitter electrodes of NPN transistor 127 and resistor 128. Transistor 127, therefore, operates as a latch, to latch trigger circuit 111 in the alternate state of operation to which it is operated in response to the trigger signal upon junction 110 whereby the ignition spark signal upon junction 120 is maintained to prevent the reenergization of the ignition coil 7 primary winding 5 for the reason that, so long as the ignition spark signal is maintained, NPN transistor 125 of the electronic control unit is maintained conductive. As previously explained, while NPN transistor 125 is conductive, switching NPN transistor Darlington pair 12 is not conductive.

As the alternating current timing signals produced by electrical generator assembly 20 are continuously applied to the electronic control unit, when the positive polarity half cycle of any of the series of timing signals during which the timing signal is overridden by the ignition signal produced by the circuit just described passes through zero in a positive to a negative polarity direction, transistor 60 of the electronic controller is rendered not conductive, transistor 65 is rendered conductive, transistor 70 is rendered not conductive, transistor 75 is rendered conductive and transistor 77 is rendered not conductive, as has been previously explained. When transistor 77 goes not conductive, current source 78 supplies base-emitter drive current to NPN transistor 130 through lead 131 and resistor 132. The base-emitter drive current triggers NPN transistor 130 conductive through the collector-emitter electrodes thereof to drain base-emitter drive current from NPN transistor 113 of the trigger circuit 111. Therefore, NPN transistor 113 goes not conductive and transistors 114 and 115 go conductive to place the trigger circuit 111 in the initial operating state wherein the potential signal upon each of junctions 120 and 121 is of a potential level substantially equal to the potential drop across common emitter resistor 126 plus the potential drop across the collector-emitter electrodes of respective transistors 114 and 115. These signals are each of an insufficient level to maintain respective NPN transistors 125 and 127 conductive, consequently, the electronic engine speed ignition spark advance circuit is unlatched.

Set forth schematically in FIG. 1 is a circuit responsive to each selected half cycle of the series of alternating current timing signals produced in synchronism with engine 3 by electrical generator assembly 20 and is operative to produce a series of substantially square wave electrical signals having leading and trailing edges with the trailing edges thereof being substantially coincident with the point of zero crossover into the next half cycle. This circuit is disclosed and described in detail in copending U.S. application Ser. No. 101,762, now U.S. Pat. No. 4,317,437 Lindgren, that was filed Dec. 10, 1979 and is assigned to the same assignee as is this invention. The specification and drawing of this application Ser. No. 101,762 is specifically incorporated by reference in this specification, therefore, this circuit will be only briefly described in this specification.

Junction 58 upon which is present a potential level substantially equal the potential level upon terminal end 22a of output coil 22 of electrical generator assembly 20 at all engine speeds, as hereinabove described, is connected through lead 103 to the base of NPN transistor 160.

Junction 40 is connected through leads 41 and 42 to the junction between resistor 161 and current sink 162. As has been previously brought out, the potential level upon terminal end 22b of output coil 22 of electrical generator assembly 20 is equal to and follows the potential level upon junction 40.

The current produced by current source 163 flows through lead 164 and resistor 161 and is sinked to point of reference or ground potential 2 by current sink 162. As a signal of a potential level signal substantially equal to that upon terminal end 22b of output coil 22 is applied to the junction between resistor 161 and current sink 162, the reference potential signal upon junction 165 with respect to point of reference or ground potential 2 is a first potential level that is equal to the sum of the potential levels with respect to point of reference or ground potential 2 upon terminal end 22b of output coil 22 plus the potential drop across resistor 161 as a result of the current supplied by current source 163. Therefore, the first potential level of the reference potential signal upon junction 165 with respect to point of reference or ground potential 2 is of a substantially constant incremental potential value that is equal to the potential drop across resistor 161 as a result of the current supplied by current source 163 flowing therethrough greater than the potential level upon terminal end 22b of the electrical generator assembly output coil 22 at all engine speeds.

Figure 4:
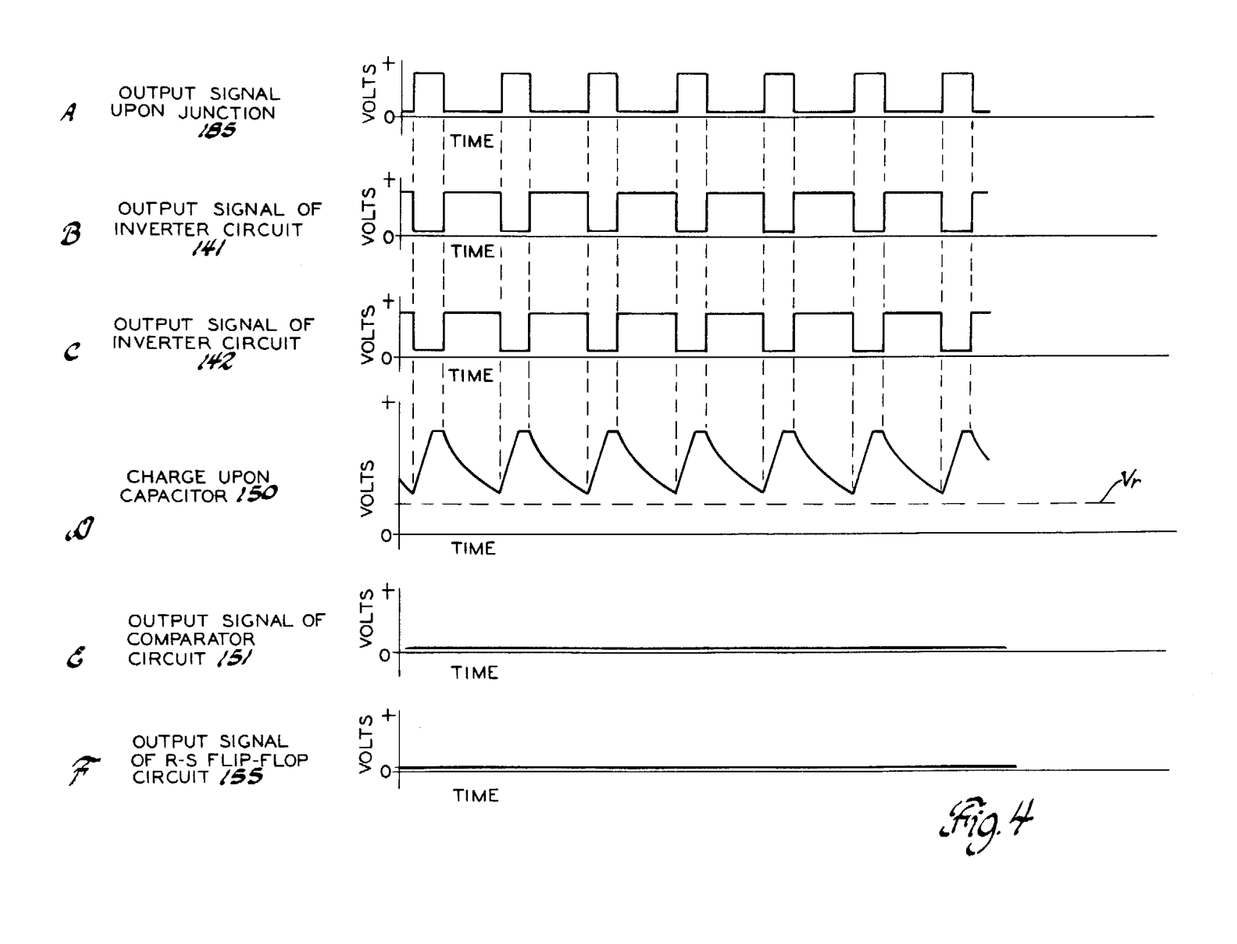

Assuming that the potential signal upon terminal end 22a of output coil 22 of electrical generator assembly 20 is of a negative polarity with respect to the potential signal upon terminal end 22b, NPN transistor 160 is not conductive. With transistor 160 not conducting, there is no circuit through which emitter-base drive current may be supplied to dual collector PNP transistor 174, consequently, this device is also not conductive. While transistor 174 is not conductive, there is no base-emitter drive current supplied to NPN transistors 176 and 177, consequently, these devices are also not conductive. With transistor 176 not conductive, the current supplied by current source 180 flows through lead 181, diode 182 and resistor 161 and is sinked to point of reference or ground potential 2 through current sink 162. As a result of this current flow through resistor 161 in addition to the current supplied by current source 163 flowing through resistor 161, the reference potential signal upon junction 165 is increased to a second potential level with respect to point of reference or ground potential 2 that is of a value greater than the first potential level of this reference signal by an amount equal to the potential drop across resistor 161 as a result of the additional current supplied by current source 180 flowing therethrough. The reference potential signal of the second potential level upon junction 165 supplies base-emitter drive current to NPN transistor 179 to render this device conductive through the collector-emitter electrodes thereof and is the potential level with respect to point of reference or ground potential 2 to which the potential level with respect to point of reference or ground potential 2 upon terminal end 22a of output coil 22 of electrical generator assembly 20 must rise to render NPN transistor 160 conductive. With NPN transistor 177 not conducting, current source 183 supplies base-emitter drive current to NPN transistor 184 to render this device conductive through the collector-emitter electrodes thereof. With transistor 184 conducting, the potential upon junction 185, the output signal of this circuit, is substantially ground potential or a logic 0, FIGS. 3B and 4A. As the potential level with respect to point of reference or ground potential 2 upon terminal end 22a of output coil 22 of electrical generator assembly 20 increases in a positive going direction to a potential level substantially equal to that of the reference potential signal of the second potential level present upon junction 165, transistor 160 is rendered conductive. When transistor 160 conducts, transistor 179 goes not conductive and transistor 174 emitter-collector current begins to flow through conducting transistor 160 and current sink 186 to point of reference or ground potential 2. The collector current of transistor 174 supplies base-emitter drive current through resistors 188 and 189 to respective NPN transistors 176 to 177 to render these devices conductive. Conducting transistor 176 diverts the current supplied by current source 180 to point of reference or ground potential 2 and conducting transistor 177 diverts the current supplied by current source 183 to point of reference or ground potential 2. As conducting transistor 177 diverts the current supplied by current source 183 to point of reference or ground potential 2, insufficient base-emitter drive current is supplied to NPN transistor 184 to maintain this device conductive, consequently, transitor 184 goes not conductive. When transistor 184 goes not conductive, the signal upon junction 185, the output signal of this circuit, is of a potential level substantially equal to the Zener diode 197 potential and is therefore a logic 1 output signal, FIGS. 3B and 4A. As conducting transistor 176 diverts the current supplied by current source 180 to point of reference or ground potential 2, the current supplied by current source 180 no longer flows through resistor 161 and current sink 162, consequently, the reference potential signal upon junction 165 reduces to the first potential level that is of a value substantially equal to the potential level upon terminal end 22b of output coil 22 of electrical generator assembly 20 plus the potential drop across resistor 161 as a result of the current supplied by current source 163 flowing therethrough. This lower reference potential signal of the first potential level upon junction 165 sets the turn-off point for transistor 160. As the potential level upon terminal end 22a of output coil 22 of electrical generator assembly 20 continues through the positive polarity half of each cycle of the alternating current timing signals induced therein, this potential level goes through maximum and falls in a negative going direction until it is of a level substantially equal to that of the reference potential source of the first potential level present upon junction 165. At this time, the NPN transistor 160 is rendered not conductive and NPN transistor 179 is rendered conductive. Upon transistor 160 going not conductive, emitter-collector current flow ceases through transistor 174 to place the circuitry in the initial state with NPN transistors 176 and 177 not conducting. As transistor 176 goes not conductive, the current supplied by the current source 180 is no longer diverted through transistor 176 to point of reference or ground potential 2, consequently, the current supplied by current source 180 again flows through diode 182 and resistor 161 and is sinked to point of reference or ground potential 2 through current sink 162. Therefore, the potential level of the reference potential signal upon junction 165 increases to the second potential level value. As transistor 177 goes not conductive, current source 183 supplies base-emitter drive current for NPN transistor 184 to render this device conductive. Upon the conduction of transistor 184, the signal upon junction 185, the output signal of this circuit, goes to substantially ground potential and is, therefore, a logic 0 output signal, FIGS. 3B and 4A. As NPN transistor 184 is rendered conductive during each positive polarity half cycle of the alternating current timing signals when the level of the potential upon terminal end 22a of output coil 22 of electrical generator assembly 20 reduces in a negative going direction to a potential level value substantially equal to that of the potential signal present upon terminal end 22b plus the incremental potential level value produced by the flow of current from current source 163 through resistor 161, this logic 0 output signal is produced substantially at the time the potential level upon terminal end 22a of output coil 22 crosses that of the potential upon terminal end 22b. This is substantially coincident with the point of zero crossover into the next half cycle in a positive to negative going direction.

Set forth schematically in FIG. 1 is the circuit of this invention that is operative to inhibit engine speed ignition spark advance with engine speeds less than a selected value. The operation of this circuit will now be described on the basis of an engine speed less than the selected value.

Figure 8:
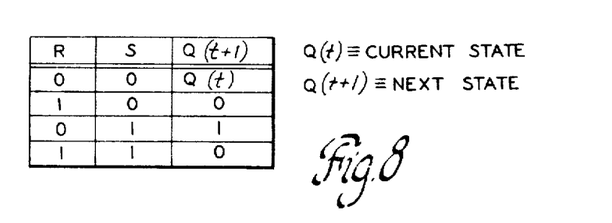
FIG. 8 is a truth table for an R-S flip-flop circuit.

The output signals of the hereinabove described circuit that is operative to produce a series of substantially square wave electrical signals that appear upon junction 185, FIG. 3B, are applied through resistor 135 to the input terminal of each of two conventional inverter circuits 141 and 142. These inverter circuits are operative to invert the square wave electrical signals as illustrated by respective FIGS. 3C and 3D. Further, as a result of the flow of current supplied by current source 143 through resistor 144, a reference potential signal $V_r$ is present upon junction 145 and is of a positive polarity with respect to point of reference or ground potential 2. Assuming a logic 0 signal to be present upon junction 185 and capacitor 150 to be discharged to a potential level less than that of the reference potential signal $V_r$, FIG. 3E, the resulting logic 1 output signal of inverter circuit 141 supplies base-emitter drive current to NPN transistor 146 to render this device conductive through the collector-emitter electrodes thereof and the resulting logic 1 output signal of inverter circuit 142 is applied to the "R" input terminal of a conventional R-S flip-flop circuit 155, the truth table for which is set forth in FIG. 8. Conducting transistor 146 drains the current supplied by current source 147 to point of reference or ground potential 2, consequently, NPN transistor 148 is not conductive. As the charge upon capacitor 150 is applied to the minus (−) input terminal of a conventional voltage comparator circuit 151 and the reference potential signal $V_r$ present upon junction 145 is applied to the plus (+) input terminal thereof, comparator circuit 151 produces a logic 1 output signal, FIG. 3F, that is applied to the "S" input of R-S flip-flop circuit 155. Referring to the truth table of FIG. 8, with a logic 1 signal applied to both the "R" and "S" input terminals, R-S flip-flop circuit 155 produces a logic 0 output signal upon the "Q" output terminal thereof, FIG. 3G.

Upon the occurrence of a leading edge of the square wave electrical signals, a logic 1 signal is present upon junction 185, FIG. 3B, that is inverted to a logic 0 signal by inverter circuits 141 and 142, respective FIGS. 3C and 3D. The logic 0 output signal of inverter circuit 141 does not supply sufficient base-emitter drive current to NPN transistor 146 to maintain this device conductive, consequently, it is rendered not conductive and the logic 0 output signal of inverter circuit 142 is applied to the "R" input terminal of R-S flip-flop circuit 155. As the logic 1 output signal of comparator circuit 151, FIG. 3F, is applied to the "S" input terminal of R-S flip-flop circuit 155 at this time, a logic 0 signal is present upon the "R" input terminal and a logic 1 signal is present upon the "S" input terminal. Referring to the truth table of FIG. 8, in response to this logic input signal combination, R-S flip-flop circuit 155 produces a logic 1 engine speed ignition spark advance inhibit output signal, FIG. 3G. Upon transistor 146 going not conductive, current source 147 supplies base-emitter drive current to NPN transistor 148 to render this device conductive through the collector-emitter electrode thereof and also produces a flow of current through diode 157 and Zener diode 158. The logic 1 engine speed ignition spark advance inhibit output signal of R-S flip-flop circuit 155, FIG. 3G, is applied through lead 152, circuit points 152(1) and 152(2) of respective FIGS. 1 and 2 and the FIG. 2 extension of lead 152 to the base electrode of NPN transistor 153. This logic 1 engine speed ignition spark advance inhibit signal supplies base-emitter drive current to NPN transistor 153 to render this device conductive through the collector-emitter electrode thereof. Conducting transistor 153 drains the current supplied through resistor 101 to point of reference or ground potential 2 to maintain NPN transistor 105 not conductive regardless of the action of the hereinabove described engine speed ignition spark advance circuit. As a consequence, so long as transistor 153 is conductive, the engine speed ignition spark advance circuit is inhibited.

Upon the conduction of transistor 148, the current supplied by current source 156 rapidly charges capacitor 150 linearly, FIG. 3E, to a potential level substantially equal to the potential level $V_z$ across Zener diode 158. When the charge level upon capacitor 150 rises through that of the reference potential $V_r$, comparator circuit 151 switches to the operating state in which a logic 0 signal is present upon the output terminal thereof, FIG. 3F, that is applied to the "S" input terminal of R-S flip-flop circuit 155. At this time, a logic 0 signal is present upon both the "R" and "S" input terminals of R-S flip-flop circuit 155. Referring to the truth table of FIG. 8, in response to these two logic 0 input signals, R-S flip-flop circuit 155 does not change states, therefore, a logic 1 signal remains upon the "Q" output terminal thereof, FIG. 3G, to maintain transistor 153, FIG. 2, conductive, a condition that maintains the engine speed ignition spark advance circuit inhibited.

Upon the occurrence of the next trailing edge of the square wave electrical signals, a logic 0 signal is present upon junction 185, FIG. 3B, that is inverted to a logic 1 signal by inverter circuits 141 and 142, FIGS. 3C and 3D. The logic 1 output signal of inverter circuit 141 supplies base-emitter drive current to NPN transistor 146 to render this device conductive through the collector-emitter electrode thereof and the logic 1 output signal of inverter circuit 142 is applied to the "R" input terminal of R-S flip-flop circuit 155. At this time, therefore, there is a logic 1 signal present upon the "R" input terminal and a logic 0 signal present upon the "S" input terminal of R-S flip-flop circuit 155. Referring to the truth table of FIG. 8, R-S flip-flop circuit 155 is responsive to this input signal combination to produce a logic 0 output signal upon the "Q" output terminal thereof, FIG. 3G. As this logic 0 output signal does not supply sufficient base-emitter drive current to NPN transistor 153 of FIG. 2 to maintain this device conductive, transistor 153 is rendered not conductive to remove the engine speed ignition spark advance inhibit. A transistor 146 is conductive at this time, this device drains base-emitter drive current from NPN transistor 148 to render this transistor not conductive. When transistor 148 goes not conductive, the charge circuit for capacitor 150 is interrupted, consequently, capacitor 150 discharges exponentially through variable resistor 154, FIG. 3E. When the charge level upon capacitor 150 has decayed to the level of the reference potential signal $V_r$, comparator circuit 151 switches to the state in which a logic 1 signal is present upon the output terminal thereof, FIG. 3F, that is applied to the "S" input terminal of R-S flip-flop circuit 155. At this time, therefore, there is a logic 1 signal present upon both the "R" and "S" input terminals of R-S flip-flop circuit 155. Referring to the truth table of FIG. 8, R-S flip-flop circuit 155 is responsive to this input signal combination to maintain a logic 0 signal upon the "Q" output terminal thereof, FIG. 3G.

Upon the occurrence of the next leading edge of the square wave electrical signals, a logic 1 signal is present upon junction 185, FIG. 3B, that is inverted to a logic 0 signal by inverter circuits 141 and 142, respective FIGS. 3C and 3D. The logic 0 output signal of inverter circuit 141 does not supply sufficient base-emitter drive current to NPN transistor 146 to maintain this device conductive, consequently, it is rendered not conductive and the logic 0 output signal of inverter circuit 142 is applied to the "R" input terminal of R-S flip-flop circuit 155. As the logic 1 output signal of comparator circuit 151, FIG. 3F, is applied to the "S" input terminal of R-S flip-flop circuit 155 at this time, a logic 0 signal is present upon the "R" input terminal and a logic 1 signal is present upon the "S" input terminal. Referring to the truth table of FIG. 8, in response to this logic input signal combination, R-S flip-flop circuit 155 produces a logic 1 engine speed ignition spark advance inhibit output signal, FIG. 3G. Upon transistor 146 going not conductive, current source 147 supplies base-emitter drive current to NPN transistor 148 to render this device conductive through the collector-emitter electrode thereof and also produces a flow of current through diode 157 and Zener diode 158. The logic 1 engine speed ignition spark advance inhibit output signal of R-S flip-flop circuit 155, FIG. 3G, is applied through lead 152, circuit points 152(1) and 152(2) of respective FIGS. 1 and 2 and the FIG. 2 extension of lead 152 to the base electrode of NPN transistor 153. This logic 1 engine speed ignition spark advance inhibit signal supplies base-emitter drive current to NPN transistor 153 to render this device conductive through the collector-emitter electrode thereof. Conducting transistor 153 drains the current supplied through resistor 101 to point of reference or ground potential 2 to maintain NPN transistor 105 not conductive regardless of the action of the hereinabove described engine speed ignition spark advance circuit. As a consequence, so long as transistor 153 is conductive, the engine speed ignition spark advance circuit is inhibited. Upon the conduction of transistor 148, the current supplied by current source 156 rapidly charges capacitor 150 linearly, FIG. 3E, to a potential level substantially equal to the potential level across Zener diode 158. When the charge level upon capacitor 150 rises through that of the reference potential $V_r$, comparator circuit 151 switches to the operating state in which a logic 0 signal is present upon the output terminal thereof, FIG. 3F, that is applied to the "S" input terminal of R-S flip-flop circuit 155. At this time, a logic 0 signal is present upon both the "R" and "S" input terminals of R-S flip-flop circuit 155. Referring to the truth table of FIG. 8, in response to these two logic 0 input signals, R-S flip-flop circuit 155 does not change states, therefore, a logic 1 signal remains upon the "Q" output terminal thereof, FIG. 3G, to maintain transistor 153, FIG. 2, conductive, a condition that maintains the engine speed ignition spark advance circuit inhibited.

Upon the occurrence of the next trailing edge of the square wave electrical signals, a logic 0 signal is present upon junction 185, FIG. 3B, that is inverted to a logic 1 signal by inverter circuits 141 and 142, FIGS. 3C and 3D. The logic 1 output signal of inverter circuit 141 supplies base-emitter drive current to NPN transistor 146 to render this device conductive through the collector-emitter electrode thereof and the logic 1 output signal of inverter circuit 142 is applied to the "R" input terminal of R-S flip-flop circuit 155. At this time, therefore, there is a logic 1 signal present upon the "R" input terminal and a logic 0 signal present upon the "S" input terminal of R-S flip-flop circuit 155. Referring to the truth table of FIG. 8, R-S flip-flop circuit 155 is responsive to this input signal combination to produce a logic 0 output signal upon the "Q" output terminal thereof, FIG. 3G. As this logic 0 output signal does not supply sufficient base-emitter drive current to NPN transistor 153 of FIG. 2 to maintain this device conductive, transistor 153 is rendered not conductive to remove the engine speed ignition spark advance inhibit. As transistor 146 is conductive at this time, this device drains base-emitter drive current from NPN transistor 148 to render this transistor not conductive. When transistor 148 goes not conductive, the charge circuit for capacitor 150 is interrupted, consequently, capacitor 150 discharges exponentially through variable resistor 154, FIG. 3E. When the charge level upon capacitor 150 has decayed to the level of the reference potential signal $V_r$, comparator circuit 151 switches to the state in which a logic 1 signal is present upon the output terminal thereof, FIG. 3F, that is applied to the "S" input terminal of R-S flip-flop circuit 155. At this time, therefore, there is a logic 1 signal present upon both the "R" and "S" input terminals of R-S flip-flop circuit 155. Referring to the truth table of FIG. 8, R-S flip-flop circuit 155 is responsive to this input signal combination to maintain a logic 0 signal upon the "Q" output terminal thereof, FIG. 3G.

So long as the engine remains running at a speed less than the selected value, the sequence of events just described is repeated to produce an engine speed ignition spark advance inhibit signal substantially for the duration of each square wave electrical signal.

So that engine speed ignition spark advance is not inhibited with engine speeds greater than the selected value, the circuit of this invention is designed to be not operative to produce an output engine speed ignition spark advance inhibit signal at these engine speeds. Considering the frequency of the timing signals when the engine is running at a speed substantially equal to the selected value and the duty cycle of the series of square wave electrical signals, the voltage level $V_c$ to which capacitor 150 charges as determined by the inverse breakdown potential rating of the unit selected for Zener diode 158, the voltage level of the reference potential signal $V_r$ and the R-C time constant of capacitor 150 and resistor 154 are so selected relative to each other that the charge upon capacitor 150 decays exponentially to a level substantially equal to the reference potential signal $V_r$ when the engine is running at a speed substantially equal to the selected value but will not decay to the level of the reference potential signal $V_r$ at all engine speeds greater than the selected value.

To calculate the time, t, at which the charge upon capacitor 150 will decay exponentially to the value of the reference potential signal $V_r$:

$$V_c(t) = V_z e^{-t/RC} \qquad (1)$$

$$V_r = V_z e^{-t/RC} \qquad (2)$$

$$t = -RC \ln(V_r/V_z) \qquad (3)$$

where:

C = capacitance of capacitor 150
R = ohmic resistance of resistor 154
$V_z$ = voltage across Zener diode 158
$V_c(t)$ = voltage across capacitor 150

With an engine speed greater than the selected value, the frequency of the square wave electrical signals is greater than that at the engine speed less than the selected value previously described as shown in FIG. 4A. Assuming a logic 0 signal to be present upon junction 185 and capacitor 150 to be charged to a voltage level greater than that of the reference potential signal $V_r$, FIG. 4D, the resulting logic 1 output signal of inverter circuit 141 supplies base-emitter drive current to NPN transistor 146 to render this device conductive through the collector-emitter electrode thereof and the resulting logic 1 output signal of inverter circuit 142 is applied to the "R" input terminal of R-S flip-flop circuit 155. Conducting NPN transistor 146 drains the current supplied by current source 147 to point of reference or ground potential 2, consequently, NPN transistor 148 is not conductive. As the charge upon capacitor 150 is applied to the minus (−) input terminal of voltage comparator circuit 151 and the reference potential signal $V_r$ present upon junction 145 is applied to the plus (+) input terminal thereof, comparator circuit 151 produces a logic 0 output signal, FIG. 4E, that is applied to the "S" input terminal of R-S flip-flop circuit 155. Referring to the truth table of FIG. 8, with a logic 1 signal applied to the "R" input terminal and a logic 0 signal applied to the "S" input terminal, R-S flip-flop circuit 155 produces a logic 0 output signal upon the "Q" output terminal thereof, FIG. 4F.

Upon the occurrence of a leading edge of the square wave electrical signals, a logic 1 signal is present upon junction 185, FIG. 4A, that is inverted to a logic 0 signal by inverter circuits 141 and 142, respective FIGS. 4B and 4C. The logic 0 output signal of inverter circuit 141 does not supply sufficient base-emitter drive current to NPN transistor 146 to maintain this device conductive, consequently, it is rendered not conductive and the logic 0 output signal of inverter circuit 142 is applied to the "R" input terminal of R-S flip-flop circuit 155. As the logic 0 output signal of comparator circuit 151, FIG. 4E, is applied to the "S" input terminal of R-S flip-flop circuit 155, a logic 0 signal is present upon the "R" input terminal and a logic 0 signal is present upon the "S" input terminal. Referring to the truth table of FIG. 8, in response to this logic input signal combination, R-S flip-flop circuit 155 does not change states, consequently, a logic 0 output signal, FIG. 4E, is maintained upon the output terminal thereof. Upon transistor 146 going not conductive, current source 147 supplies base-emitter drive current to NPN transistor 148 to render this device conductive through the collector-emitter electrode thereof and also produces a flow of current through diode 157 and Zener diode 158. The logic 0 output logic signal of R-S flip-flop circuit 155, FIG. 4F, is applied through lead 152, circuit points 152(1) and 152(2) of respective FIGS. 1 and 2 and the FIG. 2 extension of lead 152 to the base electrode of NPN transistor 153. As this logic 0 signal does not supply sufficient base-emitter drive current to NPN transistor 153 to render this device conductive through the collector-emitter electrode thereof, the engine speed ignition spark advance circuitry is not inhibited.

Upon the conduction of transistor 148, the current supplied by current source 156 rapidly charges capacitor 150 linearly, FIG. 4D, to a potential level substantially equal to the potential level across Zener diode 158. However, since the charge upon capacitor 150 has not decayed below the level of the reference potential signal $V_r$, comparator circuit 151 does not change states to maintain a logic 0 signal upon the output terminal thereof, FIG. 4F.

Upon the occurrence of the next trailing edge of the square wave electrical signals, a logic 0 signal is present upon junction 185, FIG. 4A, that is inverted to a logic 1 signal by inverter circuits 141 and 142, FIGS. 4B and 4C. The logic 1 output signal of inverter circuit 141 supplies base-emitter drive current to NPN transistor 146 to render this device conductive through the collector-emitter electrode thereof and the logic 1 output signal of inverter circuit 142 is applied to the "R" input terminal of R-S flip-flop circuit 155. At this time, therefore, there is a logic 1 signal present upon the "R" input terminal and a logic 0 signal present upon the "S" input terminal of R-S flip-flop circuit 155. Referring to the truth table of FIG. 8, R-S flip-flop circuit 155 is responsive to this input signal combination to produce a logic 0 output signal upon the "Q" output terminal thereof, FIG. 4F. As transistor 146 is conductive at this time, this device drains base-emitter drive current from NPN transistor 148 to render this transistor not conductive. When transistor 148 goes not conductive, the charge circuit for capacitor 150 is interrupted, consequently, capacitor 150 discharges exponentially through variable resistor 154, FIG. 4D.

Upon the occurrence of the next leading edge of the square wave electrical signals, a logic 1 signal is present upon junction 185, FIG. 4A, that is inverted to a logic 0 signal by inverter circuits 141 and 142, respective FIGS. 3B and 3C. The logic 0 output signal of inverter circuit 141 does not supply sufficient base-emitter drive current to NPN transistor 146 to maintain this device conductive, consequently, it is rendered not conductive and the logic 0 output signal of inverter circuit 142 is applied to the "R" input terminal of R-S flip-flop circuit 155. As the logic 0 output signal of comparator circuit 151, FIG. 4E, is applied to the "S" input terminal of R-S flip-flop circuit 155, a logic 0 signal is present upon the "R" input terminal and a logic 0 signal is present upon the "S" input terminal. Referring to the truth table of FIG. 8, in response to this logic input signal combination, R-S flip-flop circuit 155 does not change states, consequently, a logic 0 output signal, FIG. 4E, is maintained upon the output terminal thereof, FIG. 4F. Upon transistor 146 going not conductive, current source 147 supplies base-emitter drive current to NPN transistor 148 to render this device conductive through the collector-emitter electrode thereof and also produces a flow of current through diode 157 and Zener diode 158.

Upon the conduction of transistor 148, the current supplied by current source 156 rapidly charges capacitor 150 linearly, FIG. 4D, to a potential level substantially equal to the potential level across Zener diode 158. However, since the charge upon capacitor 150 has not decayed below the level of the reference potential signal $V_r$, comparator circuit 151 does not change states to maintain a logic 0 signal upon the output terminal thereof, FIG. 4F.

Upon the occurrence of the next trailing edge of the square wave electrical signals, a logic 0 signal is present upon junction 185, FIG. 4A, that is inverted to a logic 1 signal by inverter circuits 141 and 142, FIGS. 4B and 4C. The logic 1 output signal of inverter circuit 141 supplies base-emitter drive current to NPN transistor 146 to render this device conductive through the collector-emitter electrode thereof and the logic 1 output signal of inverter circuit 142 is applied to the "R" input terminal of R-S flip-flop circuit 155. At this time, therefore, there is a logic 1 signal present upon the "R" input terminal and a logic 0 signal present upon the "S" input terminal of R-S flip-flop circuit 155. Referring to the truth table of FIG. 8, R-S flip-flop circuit 155 is responsive to this input signal combination to produce a logic 0 output signal upon the "Q" output terminal thereof, FIG. 4F. As transistor 146 is conductive at this time, this device drains base-emitter drive current from NPN transistor 148 to render this transistor not conductive. When transistor 148 goes not conductive, the charge circuit for capacitor 150 is interrupted, consequently, capacitor 150 discharges exponentially through variable resistor 154, FIG. 4D.

So long as the engine remains running at a speed greater than the selected value, there is insufficient time between each trailing and the next leading edge of the square wave electrical signals for the charge upon capacitor 150 to decay exponentially to a level equal to that of the reference potential signal $V_r$. As a consequence, comparator circuit 151 is maintained in the state in which a logic 0 signal is present upon the output terminal thereof, FIG. 4E. As comparator circuit 151, therefore, does not supply a logic 1 "Set" signal to R-S flip-flop circuit 155, this device does not change from the state in which a logic 0 signal is present upon the "Q" output terminal thereof, FIG. 4F. Therefore, while the engine is running at a speed greater than a selected value, this circuit does not produce an engine speed ignition spark advance inhibit signal.

From this description, it is apparent that the circuitry including inverter circuit 141, NPN transistor 146, diode 157, Zener diode 158, NPN transistor 148, current source 156, and capacitor 150 is responsive to the square wave electrical signal trailing and leading edges for producing an electrical signal that changes from a selected initial level with time toward another level at such a rate as to obtain a selected second level only when the engine speed is less than a selected value and for reestablishing this electrical signal to the selected initial level, respectively, whereby a time variable electrical signal is produced between each square wave electrical signal. That is, this time variable electrical signal that is produced upon the discharge of capacitor 150 through variable resistor 154 is initiated at each trailing edge of the square wave electrical signals and is terminated at each successive leading edge of the square wave electrical signals. Further, comparator circuit 151 is responsive to the time variable electrical signal attaining the selected second level when the engine speed is less than the selected value for producing an output electrical signal and R-S flip-flop circuit 155 is responsive to this electrical signal and the leading edge of the next square wave electrical signal for producing an output engine speed ignition spark advance inhibit electrical signal and to the trailing edge of the square wave electrical signals for terminating this output engine speed ignition spark advance inhibit electrical signal whereby this output electrical signal is produced substantially for the duration of each of the square wave electrical signals.

As inverter circuits 141 and 142, voltage comparator circuit 151 and R-S flip-flop circuit 155 may be commercially available items well known in the art and, per se, form no part of this invention, each has been set forth in this specification in block form.

The advantage of the circuit of this invention is that the circuitry effective to inhibit the engine speed ignition spark advance adjustment circuitry with engine speeds less than a selected value may be calibrated to be effective at any selected engine speed by merely adjusting the ohmic value of variable resistor 154.

While a preferred embodiment of the present invention has been shown and described, it will be obvious to those skilled in the art that various modifications and substitutions may be made without departing from the spirit of the invention that is to be limited only within the scope of the appended claims.

The embodiments of the invention in which an exclusive property or privilege is claimed are defined as follows:

1. In an internal combustion engine electronic ignition system of the type that includes mutually exclusive discrete circuits responsive to each selected half cycle of a series of alternating current timing signals produced in synchronism with an associated engine that are operative, respectively, to effect engine speed ignition spark advance adjustment and to produce a series of substantially square wave electrical signals having leading and trailing edges with the trailing edges being substantially coincident with the point of zero crossover of each selected half cycle of the timing signals into the next half cycle, the improvement of circuitry operative to inhibit engine speed ignition spark advance adjustment with engine speeds less than a selected value, comprising:

means responsive to said square wave electrical signal trailing and leading edges for producing a time variable electrical signal that is initiated at each said trailing edge, changes from a selected initial level with time toward another level at such a rate as to attain a selected second level only when said engine speed is less than said selected value and is terminated at each said leading edge;

means responsive to said time variable electrical signal attaining said selected second level when said engine speed is less than said selected value and the said leading edge of the next said square wave electrical signal for producing an electrical signal and to the said trailing edge of the same said square wave electrical signal for terminating said electrical signal; and means for applying said electrical signal to said circuitry operative to effect engine speed ignition spark advance in such a manner as to inhibit the operation thereof.

2. In an internal combustion engine electronic ignition system of the type that includes mutually exclusive discrete circuits responsive to each selected half cycle of a series of alternating current timing signals produced in synchronism with an associated engine that are operative, respectively, to effect engine speed ignition spark advance adjustment and to produce a series of substantially square wave electrical signals having leading and trailing edges with the trailing edges being substantially coincident with the point of zero crossover of each selected half cycle of the timing signals into the next half cycle, the improvement of circuitry operative to inhibit engine speed ignition spark advance adjustment with engine speeds less than a selected value, comprising:

means responsive to said square wave electrical signal trailing and leading edges for producing an electrical signal that changes from a selected initial level with time toward another level at such a rate as to attain a selected second level only when said engine speed is less than said selected value and for reestablishing said first electrical signal to said selected initial level, respectively, whereby a time variable electrical signal is produced between each said square wave electrical signal;

means responsive to said time variable electrical signal attaining said selected second level when said engine speed is less than said selected value and the said leading edge of the next said square wave electrical signal for producing an electrical output signal and to the said trailing edge of the same said square wave electrical signal for terminating said electrical output signal; and     means for applying said electrical output signal to said circuitry operative to effect engine speed ignition spark advance in such a manner as to inhibit the operation thereof.

3. In an internal combustion engine electronic ignition system of the type that includes mutually exclusive discrete circuits responsive to each selected half cycle of a series of alternating current timing signals produced in synchronism with an associated engine that are operative, respectively, to effect engine speed ignition spark advance adjustment and to produce a series of substantially square wave electrical signals having leading and trailing edges with the trailing edges being substantially coincident with the point of zero crossover of each selected half cycle of the timing signals into the next half cycle, the improvement of circuitry operative to inhibit engine speed ignition spark advance adjustment with engine speeds less than a selected value, comprising:

means responsive to said square wave electrical signal trailing and leading edges for producing a first electrical signal that changes from a selected initial level with time toward another level at such a rate as to attain a selected second level only when said engine speed is less than said selected value and for reestablishing said first electrical signal to said selected initial level, respectively;

means responsive to said first electrical signal attaining said selected second level when said engine speed is less than said selected value for producing a second electrical signal;

means responsive to said second electrical signal and the said leading edge of the next said square wave electrical signal for producing a third electrical signal and to the said trailing edge of the same said square wave electrical signal for terminating said third electrical signal; and     means for applying said third electrical signal to said circuitry operative to effect engine speed ignition spark advance in such a manner as to inhibit the operation thereof.

4. In an internal combustion engine electronic ignition system of the type that includes mutually exclusive discrete circuits responsive to each selected half cycle of a series of alternating current timing signals produced in synchronism with an associated engine that are operative, respectively, to effect engine speed ignition spark advance adjustment and to produce a series of substantially square wave electrical signals having leading and trailing edges with the trailing edges being substantially coincident with the point of zero crossover of each selected half cycle of the timing signals into the next half cycle, the improvement of circuitry operative to inhibit engine speed ignition spark advance adjustment with engine speeds less than a selected value, comprising:

a capacitor;

means responsive to each leading edge of said square wave electrical signals for effecting the charge of said capacitor and to each trailing edge of said square wave electrical signals for effecting the discharge of said capacitor at such a rate as to attain a selected charge level only when said engine speed is less than said selected value whereby a time variable electrical signal is produced between each said square wave electrical signal;

means responsive to said time variable electrical signal attaining said selected charge level when said engine speed is less than said selected value and the said leading edge of the next said square wave electrical signal for producing an electrical signal and to the said trailing edge of the same said square wave electrical signal for terminating said electrical signal; and     means for applying said electrical signal to said circuitry operative to effect engine speed ignition spark advance in such a manner as to inhibit the operation thereof.

5. In an internal combustion engine electronic ignition system of the type that includes mutually exclusive discrete circuits responsive to each selected half cycle of a series of alternating current timing signals produced in synchronism with an associated engine that are operative, respectively, to effect engine speed ignition spark advance adjustment and to produce a series of substantially square wave electrical signals having leading and trailing edges with the trailing edges being substantially coincident with the point of zero crossover of each selected half cycle of the timing signals into the next half cycle, the improvement of circuitry operative to inhibit engine speed ignition spark advance adjustment with engine speeds less than a selected value, comprising:

a capacitor;

means responsive to each leading edge of said square wave electrical signals for effecting the charge of said capacitor and to each trailing edge of said square wave electrical signals for effecting the discharge of said capacitor at such a rate as to attain a selected charge level only when said engine speed is less than said selected value whereby a time varaible electrical signal is produced between each said square wave electrical signal;

means responsive to said time variable electrical signal attaining said selected charge level when said engine speed is less than said selected value for producing a first electrical signal;

means responsive to said first electrical signal and the said leading edge of the next said square wave electrical signal for producing a second electrical signal and to the said trailing edge of the same said square wave electrical signal for terminating said second electrical signal; and means for applying said second electrical signal to said circuitry operative to effect engine speed ignition spark advance in such a manner as to inhibit the operation thereof.

* * * * *